No. 894,276.  
PATENTED JULY 28, 1908.  
H. M. MARTIN.  
VEHICLE WHEEL.  
APPLICATION FILED JUNE 10, 1907.

Witnesses  
Carl Stoughton  
Frank G. Campbell

Inventor  
Harry M. Martin  
By Chester C. Shepherd  
Attorney

UNITED STATES PATENT OFFICE.

HARRY M. MARTIN, OF COLUMBUS, OHIO.

VEHICLE-WHEEL.

No. 894,276.  Specification of Letters Patent.  Patented July 28, 1908.

Application filed June 10, 1907. Serial No. 378,054.

*To all whom it may concern:*

Be it known that I, HARRY M. MARTIN, a citizen of the United States, residing at Columbus, in the county of Franklin and State of Ohio, have invented certain new and useful Improvements in Vehicle-Wheels, of which the following is a specification.

My invention relates to vehicle wheels and has for its object the provision of a device of this character, which while possessing all the resiliency of the ordinary pneumatic tired wheel, will present a puncture-proof surface to the road bed.

A further object of the invention is the provision of a supplemental rim which may be readily applied at a very small cost, to the vehicle wheels which are already in use and which will render said wheels puncture proof.

Further objects and advantages of the invention will be set forth in the detailed description which now follows.

Figure 1:
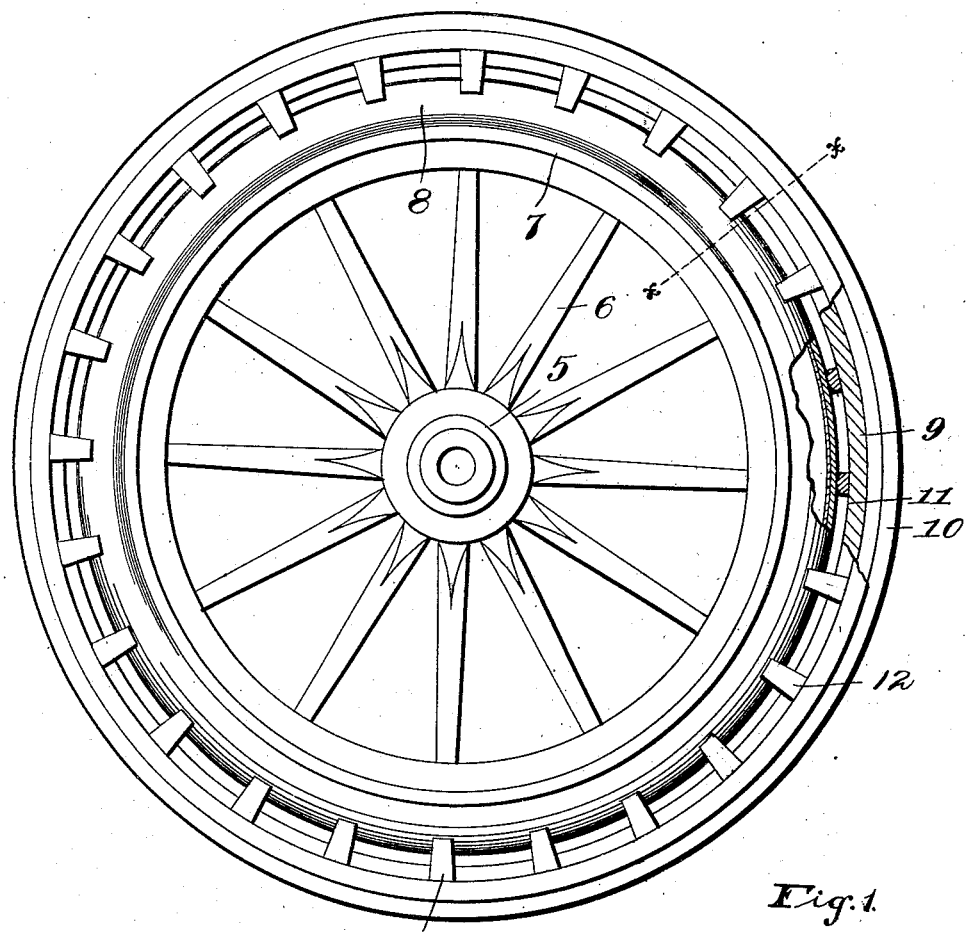
Figures 2, 3:
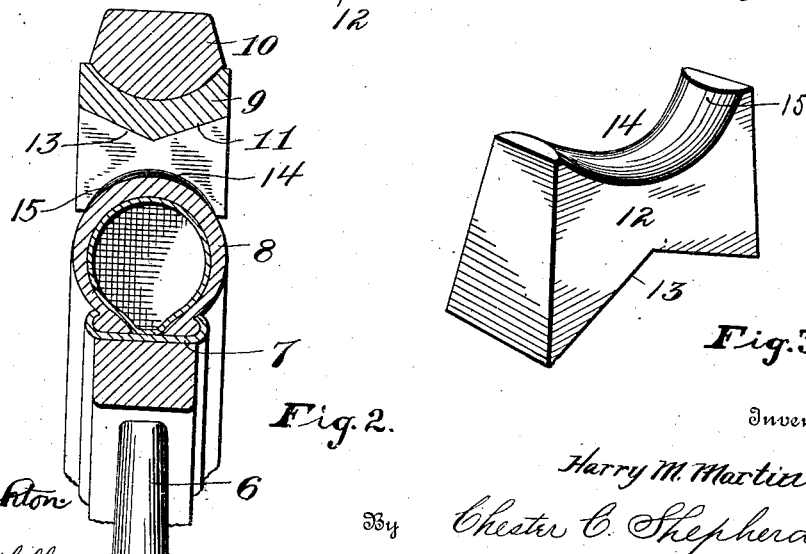

In the accompanying drawing: Figure 1 is a side elevation of an automobile wheel having my improvements applied thereto, Fig. 2 is a transverse section of a portion of said wheel and of the supplemental rim upon line x x of Fig. 1, and, Fig. 3 is a detail perspective view of one of the saddles hereinafter described.

Like numerals designate corresponding parts in all of the figures of the drawing.

Referring to the drawing, the numeral 5 designates the hub of an ordinary automobile wheel; radiating from this hub are the spokes 6 which carry the usual rim 7 to which a pneumatic tire 8 of ordinary construction is secured.

The wheel just described is of the usual and well known construction and forms no part of the present invention. It is in the supplementary rim and the means for securing it in position upon the wheel, that the present invention particularly resides. The supplementary rim 9 carries a solid tire 10 which is preferably formed of rubber. This supplementary rim has a V-shaped inner periphery 11. A plurality of saddles 12 have V-shaped bases 13 which engage with the inner periphery of the supplemental rim. These saddles are recessed as at 14 for the reception of the periphery of the tire 8, said recessed portions being rounded as at 15 to prevent the cutting of the tire. The saddles 12 may be formed of wood, rubber or leather as is found to be best suited. The provision of the rim having a V-shaped inner periphery and of the saddles having V-shaped recesses which engage said rim, provides a structure which prevents the wheel proper from being forced out of the supplementary rim when there is a tendency for the wheel to skid in passing around corners.

It will be apparent that the present invention is a very simple one and provides a structure which may be readily applied to the automobile wheels which are already in use, at a very small cost.

In applying this rim, it is but necessary to deflate the tire 8 and to place the outer or supplementary rim and the saddles in position. After this has been done, the inflation of the tire 8 will lock all of the parts securely together.

While the elements shown and described are well adapted to serve the purposes for which they are intended, it is to be understood that the invention is not limited to the precise construction set forth, but includes within its purview such changes as may be made within the scope of the appended claims.

What I claim, is:

1. The combination with a vehicle wheel having a pneumatic tire, of a supplemental rim, and a plurality of spaced saddles engaging the pneumatic tire and supporting said supplemental rim.

2. The combination with a vehicle wheel having a pneumatic tire, of a supplemental rim having a V-shaped inner periphery, and a plurality of saddles engaging the pneumatic tire and the V-shaped periphery of the supplemental rim.

3. The combination with a vehicle rim having a pneumatic tire thereon, of a supplemental rim which encircles said pneumatic tire, and saddles which space said supplementary rim from said tire, said saddles having V-shaped recesses formed therein, and said supplementary rim having a V-shaped inner periphery with which said saddles engage.

In testimony whereof I affix my signature in presence of two witnesses.

HARRY M. MARTIN.

Witnesses:
  A. L. PHELPS,
  L. CARL STOUGHTON.